Feb. 16, 1971  F. C. WHEELER ET AL  3,564,383
BATTERY CHARGER UTILIZING BIMETALLIC SWITCH FOR AUTOMATIC
SELECTION OF 6-/OR 12-VOLT CHARGING
Filed July 7, 1969
2 Sheets-Sheet 2

Inventors
Frederick C. Wheeler
Arthur J. S. Seager
By
Kenyon, Palmer & Estabrook
Attorneys

United States Patent Office 3,564,383
Patented Feb. 16, 1971

3,564,383
BATTERY CHARGER UTILIZING BIMETALLIC SWITCH FOR AUTOMATIC SELECTION OF 6- OR 12-VOLT CHARGING
Frederick C. Wheeler, Bath, Arthur J. S. Seager, Calne, and Geoffrey J. Webb, Bath, England, assignors to J.D. Electronics Limited, Wiltshire, Leafield, Corsham, England, a British company
Filed July 7, 1969, Ser. No. 839,246
Int. Cl. H02j 7/04
U.S. Cl. 320—39                              8 Claims

ABSTRACT OF THE DISCLOSURE

A battery charger for charging 6- and 12-volt batteries includes a two-position charging voltage selection switch and a device which, in response to the charging current, produces either a thermal or an electromagnetic effect which, if the charging current exceeds a particular value above the normal value, causes the switch to switch to the six-volt position. The construction or arrangement of the switch causes it to subsequently remain in this position. Voltage selection may therefore be achieved automatically in dependence on the voltage of the battery under charge.

---

This invention relates to battary chargers for charging 6- and 12-volt electrical storage batteries. The correct charging voltages for six and twelve volt batteries are naturally different and to permit selection of the appropriate voltage, it is normal practice to provide the battery charger with a two-position charging voltage selection switch.

According to the present invention a battery charger of this kind includes a device which, in response to the charging current, produces either a thermal or an electromagnetic effect which, if the charging current exceeds a particular value above the normal value, causes the two-position charging voltage selection switch to switch to the six-volt position, the construction or arrangement of the switch causing it to subsequently remain in this position. Accordingly the charging current drops and both the battery and the charger are therefore less likely to suffer damage. Preferably the particular value above which the switch switches is only slightly in excess of the normal charging current. If this is so, damage is unlikely to result if the twelve-volt charging voltage is applied to a six-volt battery. Indeed, it is a feature of the invention that voltage selection may be achieved automatically in this way. In other words, in using such a charger, if it is connected to a twelve volt battery, the switch remains in its normal position but if connected to a six-volt battery, the increased current results in the switch automatically moving to the six-volt position so that the charger delivers the reduced voltage appropriate for a six-volt battery. Such a construction requires either that the switch should switch back to the twelve-volt position when the charger is disconnected or alternatively that it should be possible to also operate the switch manually so as to re-set it to the twelve-volt position.

Battery chargers which operate in this way may take a large number of different forms. For instance, the reduction in voltage for charging six-volt batteries may be obtained by employing only half-wave rectification when charging such batteries but full-wave rectification when charging twelve-volt batteries. It will be appreciated that half-wave rectified current has an average value half that of full-wave rectified current. Such a charger may include a bridge rectifier having four rectifying elements one of which is connected in series with the two-position charging voltage selection switch. The latter is connected such that on switching to the six-volt position, it de-energises the series-connected rectifying element. In other words, on switching to the six-volt position, it breaks one arm of the bridge rectifier so that the rectifier then delivers only half-wave rectified charging current. Instead of having the bridge rectifier, a charger of this same general kind may include a supply transformer having a centre-tapped secondary winding having its ends connected to a common point through respective rectifying elements one of which is connected in series with the two-position charging voltage selection switch. The latter is connected such that on switching to the six-volt position, it de-energises the rectifying element connected in series with it. The result is the same as that just described, namely that the rectifier ceases delivering full-wave rectified charging current and instead delivers only half-wave rectified charging current.

Under some circumstances, battery charging using half-wave rectified charging current may be undesirable. Under these circumstances, the battery charger may include a voltage dropping element which is inserted into the charging circuit when the two-position charging voltage selection switch moves to the six volt position. However, voltage dropping elements have certain disadvantages. First, of necessity, they produce a not inconsiderable amount of heat. Second, they tend to stabilise the charging current for a six-volt battery at a particular value. This is undesirable since particularly in domestic battery chargers, the charging current should preferably decrease as the battery charges up. However, these disadvantages may be eliminated by the provision of a supply transformer having a secondary winding connected at three points by respective connections to respective arms of a bridge rectifier having six rectifying elements. The connections are such that a six volt charging voltage is developed between the first and second arms and twelve-volt charging voltage is developed between the first and third arms. The connection to the third arm contains the two-position charging voltage selection switch which is connected so that on switching to the six-volt position, it interrupts the connection to the third arm with the result that the charging current is diverted from the third arm to the second arm. Such a charger is described in detail later.

It is of course important that the two-position switch should remain in the six-volt position. This can be achieved by the provision of a mechanical latch. However, if the path taken by the charging current is altered consequent on the switching of the switch to the six volt position, the charger may include a second device which in response to this alteration in the charging current path produces either a thermal or an electromagnetic effect causing the switch to remain in the six volt position. For instance the switch and the device may be combined in the form of a bi-metallic switch. The charging current flowing through the bi-metallic part of the switch may generate enough heat to open the switch when the particular current level is exceeded. Preferably, however, the switch includes a resistive element connected in series with the bi-metallic strip and located so as to heat the latter. This enables the opening temperature of the switch contacts to be set at a higher value so that high ambient temperatures do no by themselves cause the contacts to open. To ensure that the switch remains in the six-volt position, another resistive element constituting the second device may be arranged to be heated by the charging current flowing when the charger is charging a six-volt battery and itself arranged to heat the bi-metallic strip.

As already indicated, electromagnetic effects instead of thermal effects may be employed. The principle is however the same. It should also be noted that in general the switch may be located in either the A.C. or in the D.C. part of the circuit depending on the configuration of the latter.

By way of example, battery chargers in accordance with the invention will now be described in more detail with reference to the accompanying drawings in which.

Figure 1:
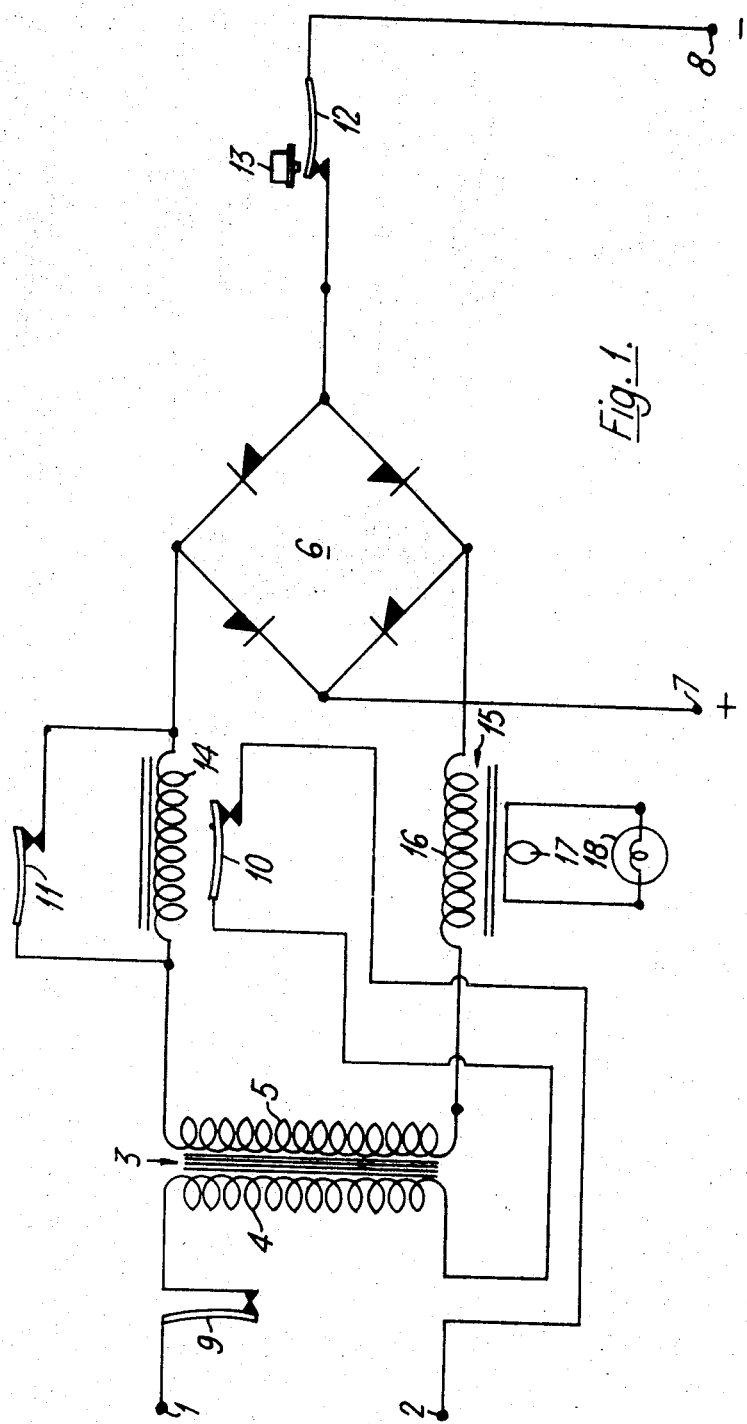
FIG. 1 is an electrical circuit diagram of one such charger.

Reference should be made first to FIG. 1 which shows a battery charger having A.C. input terminals 1 and 2, a step-down transformer 3 having a primary winding 4 and a secondary winding 5, a bridge rectifier 6, and a positive and negative output terminals 7 and 8 respectively. The charger also includes four bi-metallic switches 9, 10, 11 and 12, the latter of which is provided with a reset button 13, a voltage dropping inductor 14, a transformer 15 having a primary winding 16 and a secondary winding 17, and an indicator lamp 18. The four switches are shown in the positions which they assume when the charger is charging a twelve volt battery. The switches also assume these positions when the charger is not operating.

When the terminals 1 and 2 are connected to the A.C. supply, the voltage of the latter is applied across the primary winding 4 of the transformer 3 and a reduced voltage is developed across the secondary winding 5. Since the inductor 14 is short-circuited by the switch 11, this reduced voltage is applied across the series combination of the bridge rectifier 6 and the primary transformer winding 16. The circuit characteristics are such that the resulting full-wave rectified current which in consequence flows from the terminal 7 to the terminal 8 if a twelve-volt battery is connected between these terminals is appropriate for charging this battery. While this occurs, the voltage developed across the secondary transformer winding 17 energizes the indicator lamp 18.

If a six volt battery is connected across the terminals 7 and 8, an increased current will flow. In consequence, the bi-metallic strip in the switch 11 heats up due to its internal resistance. The thermal time constant of the strip is short and in consequence this action occurs quickly. The result is that after a short interval, the switch 11 opens thus open-circuiting the ends of the inductor 14. The charging current now flows through the inductor which acts as a voltage dropping element with the result that the voltage applied across the terminals 7 and 8 is appropriate for charging the six-volt battery. The inductor 14 also generates sufficient heat to maintain the bi-metallic strip in the switch 11 in the heated state, that is to say to maintain the switch open. To prevent chattering of the switch contacts immediately after it has opened, it is preferable that the inductor 14 should also have a short thermal time constant.

When the battery charger is disconnected from the supply, the inductor 14 cools and after a short interval, the switch 11 opens.

The purpose of the switch 9 is to prevent overheating of the transformer 3 in the event of internal failure in the charger.

The purpose of the switch 10 is to prevent the inductor 14 overheating in the event of failure of the rectifier 6. The switch 10 is arranged to open in the event of the inductor 14 heating up to a temperature slightly in excess of its normal temperature when the charger is delivering a six-volt charging current. It can be seen that when the switch 10 is open, the supply to the transformer 3 is interrupted.

The purpose of the switch 12 is to provide a cutout should the charging current ever exceed a safe maximum value. Although not indicated as such, this switch is mechanically latched so that once it cuts-out, it remains in the open position. It can be moved to the closed position by depressing the button 13.

Figure 2:
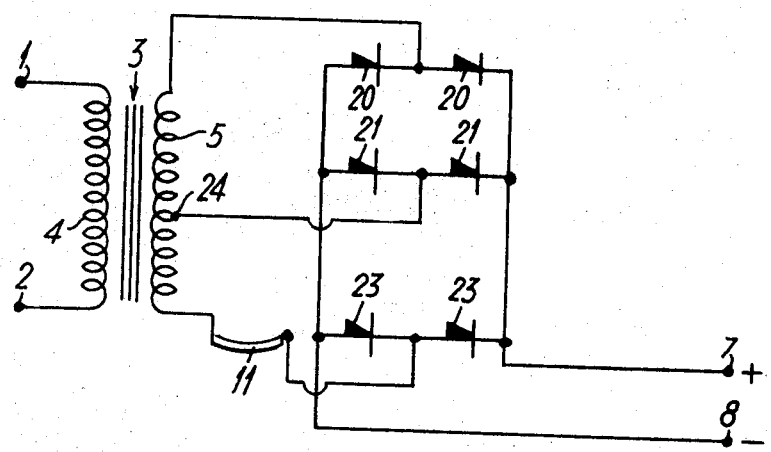
FIG. 2 is an electrical circuit diagram of another such charger.

The battery charger whose circuit is illustrated in FIG. 2 does not employ a voltage dropping element such as the inductor 14 shown in FIG. 1. Using the same reference numerals where applicable, it has input terminals 1 and 2, connected across the primary winding of a transformer 3 having a secondary winding 5. It has a bi-metallic switch 11 and positive and negative output terminals 7 and 8.

In contrast to the circuit shown in FIG. 1, the rectifier includes three arms of which one includes a pair of semiconductor diodes 20, another includes a pair of semiconductor diodes 21, and the third includes a pair of semiconductor diodes 23. As can be seen, the secondary winding 5 of the transformer is tapped at 24 and is connected to the arm containing the diodes 21. The switch 11 is connected between one end of the secondary winding 5 and the arm containing the diodes 23.

The circuit characteristics are such that when the circuit is energised, and with the switch 11 in the closed position illustrated, a voltage appropriate for charging a twelve-volt battery is developed between the arm containing the diodes 20 and the arm containing the diodes 23. When the switch 11 is open, a voltage appropriate for charging a six-volt battery is developed between the arm containing the diodes 20 and the arm containing the diodes 21. The two diodes 21 are located physically adjacent to the switch 11.

As already indicated, when the charger is charging a 12-volt battery, the switch 11 assumes the illustrated position. If, however, the terminals 7 and 8 are connected to a six-volt battery, the current through the bi-metallic strip in the switch 11 heats the strip sufficiently for the switch to open. In consequence, a reduced voltage is applied to the battery across the terminals 7 and 8. However, the charging current which now flows, instead of flowing through the two diodes 23 now flows through the two diodes 21. These diodes are designed to give a small amount of heat sufficient to cause the bi-metallic strip in the switch 11 to keep the switch open. Accordingly it can be seen that the alteration in the path taken by the charging current causes the switch 11 to remain open.

Figure 3:
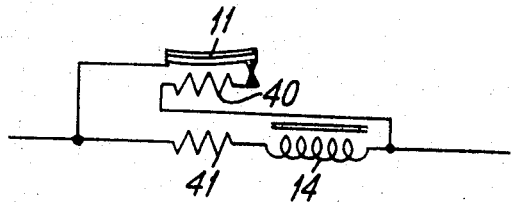
FIG. 3 is an electrical circuit diagram of a modified part of the battery charger shown in FIG. 1.

The circuit modification illustrated in FIG. 3 is advantageous if high ambient temperatures are likely to be experienced. In the case of the switches 11 shown in the previous two figures, the heat which causes them to open is generated entirely by their own resistance. Since a high resistance is undesirable, they must therefore be arranged to have a fairly low resistance and therefore develop a small amount of heat. The modification shown in FIG. 3, however, includes an additional heating element 40 connected in series with the switch 11 and located physically adjacent the switch. The element 40 assists in heating the bi-metallic strip which can thus be designed to open at a higher temperature. The modification also includes a second heating element 41 in series with the inductor 14. The reason for this is that under certain circumstances, it may be desirable to design the inductor 14 solely as an inductor and to provide a separate resistive element, namely the element 41, to heat the bi-metallic strip in the switch 11.

We claim:

1. In a battery charger for charging 6- and 12-volt batteries, a charging circuit including input terminals for connection across a voltage source, direct current output terminals for connection across a battery to be charged, two-position charging voltage selection switch means which in one position causes said circuit to apply across said output terminals a charging voltage appropriate for a 6-volt battery and in another position causes said circuit to apply across said output terminals a changing voltage appropriate for a 12-volt battery, first charging current responsive means which if said charging current exceeds a particular value above a normal value causes said switch means to switch to said 6-volt position, and retaining means for subsequently retaining said switch means in said 6-volt position.

2. A battery charger according to claim 1 in which said retaining means includes second charging current responsive means which operates only when said switch means is in said six-volt position.

3. A battery charger according to claim 2 in which said switch means and said first charging current responsive means are together constituted by bimetallic switch means and said second charging current responsive means is resistive means arranged to maintain said bimetallic switch means heated.

4. A battery charger according to claim 3 including resistive means connected in series with said bimetallic switch means for heating said bimetallic switch means.

5. In a battery charger for charging six- and twelve-volt batteries, a charging circuit including input terminals for connection across a voltage source, a transformer having a primary winding connected across said input terminals and a centre-tapped secondary winding, a bridge rectifier having six rectifying elements arranged in three arms connected by respective connections to respective ends and to said tapping on said secondary winding, two-position charging voltage selection switch means connected into one of said connections to one of said ends, direct current output terminals connected across said rectifier, first charging current responsive means which if said charging current exceeds a particular value above a normal value causes said switch means to open to reduce voltage applied across said output terminals from that appropriate for a twelve-volt battery to that appropriate for a six-volt battery, and retaining means for subsequently retaining said switch means in said six-volt position.

6. A battery charger according to claim 5 in which said retaining means includes second charging current responsive means which operates only when said switch means is in said 6-volt position.

7. A battery charger according to claim 6 in which said switch means and said first charging current responsive means are together constituted by bimetallic switch means and said second charging current responsive means is resistive means arranged to maintain said bimetallic switch means heated.

8. A battery charger according to claim 7 in which said resistive means is one of said rectifying elements.

References Cited
UNITED STATES PATENTS

| | | | |
|---|---|---|---|
| 2,067,420 | 1/1937 | Seeger et al. | 320—22 |
| 2,403,803 | 7/1946 | Kearsley | 337—103UX |
| 2,559,611 | 7/1951 | Garmany, Jr. | 321—10 |
| 2,782,357 | 2/1957 | Heyer et al. | 320—48 |
| 2,967,988 | 1/1961 | Seright | 320—36 |
| 3,105,910 | 10/1963 | Chambers | 320—48 |
| 3,156,860 | 11/1964 | Paynter | 321—47 |
| 3,165,689 | 1/1965 | Hughes | 320—18 |
| 3,343,057 | 9/1965 | Smith | 320—55 |
| 3,470,440 | 9/1969 | Rheingold et al. | 320—25 |
| 2,999,980 | 9/1961 | Barnes | 324—29.5 |

WILLIAM M. SHOOP, Jr., Primary Examiner

J. M. GUNTHER, Assistant Examiner

U.S. Cl. X.R.

320—22, 35, 51, 57; 337—103